United States Patent
Kakuta et al.

(10) Patent No.: US 7,740,278 B2
(45) Date of Patent: Jun. 22, 2010

(54) STEERING GEARBOX MOUNTING STRUCTURE

(75) Inventors: Tsutomu Kakuta, Saitama (JP); Yasuhiro Tsutsui, Saitama (JP); Kazuhito Onoda, Saitama (JP); Hiroyuki Yoshida, Saitama (JP); Koji Nagata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 687 days.

(21) Appl. No.: 11/247,518

(22) Filed: Oct. 11, 2005

(65) Prior Publication Data

US 2006/0082121 A1 Apr. 20, 2006

(30) Foreign Application Priority Data

Oct. 19, 2004 (JP) ............................. 2004-303628

(51) Int. Cl.
*B62D 1/19* (2006.01)
*B62D 21/15* (2006.01)

(52) U.S. Cl. ....................................... 280/777; 280/784

(58) Field of Classification Search ................. 180/312; 188/371, 376–378; 248/548; 280/93.513–93.515, 280/124.109, 777, 779, 784; 296/187.03, 296/187.09
See application file for complete search history.

(56) References Cited

U.S. PATENT DOCUMENTS

| | | | | |
|---|---|---|---|---|
| 3,578,782 A * | 5/1971 | Miyoshi | ..................... | 180/232 |
| 3,672,697 A * | 6/1972 | Knowles | ..................... | 280/777 |
| 3,679,163 A * | 7/1972 | Smith | ......................... | 248/548 |
| 3,851,722 A * | 12/1974 | Grosseau | ..................... | 180/232 |
| 4,817,973 A * | 4/1989 | Takeda | ........................ | 280/781 |
| 5,251,932 A * | 10/1993 | Ide | ............................. | 280/784 |
| 5,372,216 A * | 12/1994 | Tsuji et al. | ................... | 180/274 |
| 5,454,453 A * | 10/1995 | Meyer et al. | ................. | 180/377 |
| 5,560,651 A * | 10/1996 | Kami et al. | .................. | 280/788 |
| 5,605,353 A * | 2/1997 | Moss et al. | ................... | 280/784 |
| 5,613,709 A * | 3/1997 | Nakamichi | ................... | 280/777 |
| 5,737,970 A * | 4/1998 | Asbrand et al. | ............... | 74/492 |
| 5,879,026 A * | 3/1999 | Dostert et al. | ............... | 280/781 |
| 5,906,410 A * | 5/1999 | Dalinkiewicz | ............. | 296/24.4 |
| 6,409,156 B2 * | 6/2002 | Dent | ......................... | 256/13.1 |
| 6,783,157 B2 * | 8/2004 | Huang et al. | ................. | 280/785 |
| 7,040,446 B2 * | 5/2006 | Anzai et al. | ................. | 180/312 |

(Continued)

FOREIGN PATENT DOCUMENTS

FR 2653730 A1 * 5/1991

(Continued)

*Primary Examiner*—Paul N. Dickson
*Assistant Examiner*—Laura Freedman
(74) *Attorney, Agent, or Firm*—Carrier, Blackman & Associates, P.C.; William D. Blackman; Joseph P. Carrier

(57) ABSTRACT

A steering gearbox mounting structure having an intermediate bracket mounts a steering gearbox for steering wheels of a vehicle on a subframe of the vehicle. The intermediate bracket has a breakable portion which breaks when a force greater than a predetermined force is applied to the breakable portion to provide an impact absorbing stroke of an engine of the vehicle. The breakable portion may have a thin portion such as a plate or a recess portion and is more breakable in the traveling direction than the width direction. First and second intermediate brackets may be used which include first and second kinds of breakable portions that are breakable in different modes, respectively.

13 Claims, 6 Drawing Sheets

U.S. PATENT DOCUMENTS

| | | | |
|---|---|---|---|
| 7,066,492 B2 * | 6/2006 | Horita | 280/777 |
| 7,066,531 B2 * | 6/2006 | Tomita | 296/187.03 |
| 7,380,829 B2 * | 6/2008 | Kishima | 280/781 |
| 2001/0052432 A1 * | 12/2001 | Yoshioka | 180/68.3 |

FOREIGN PATENT DOCUMENTS

| | | |
|---|---|---|
| JP | 05-077737 | 3/1993 |
| JP | 06122378 A * | 5/1994 |
| JP | 08-183466 | 7/1996 |
| JP | 09-136651 | 5/1997 |

* cited by examiner

STEERING GEARBOX MOUNTING STRUCTURE

CROSS-REFERENCE TO RELATED APPLICATIONS

The present invention claims priority under 35 USC 119 based on Japanese patent application. 2004-303628, filed Oct. 19, 2004. The entire disclosure of this Japanese patent application is incorporated herein by reference.

BACKGROUND OF THE INVENTION

1. Field of the Invention

The present invention relates to a steering gearbox mounting structure detachable from a body of a vehicle upon a collision of the vehicle.

2. Description of the Related Art

In general vehicles, structures for absorbing impact energy generated upon a head-on collision of a vehicle by crush of parts at a crushable zone of the vehicle are known. During the crush of the parts at the crushable zone, the structure is designed to allow an engine arranged at the front of the vehicle to backwardly move and hit a steering gearbox behind the engine. In this operation, if the steering gearbox strongly fixed to the body interferes with the backward movement of the engine, a sufficient impact absorbing stroke cannot be provided. This may prevent impact energy from being efficiently absorbed.

Another technology for providing the impact absorbing stroke in consideration of the presence of the steering gearbox is also known as a steering gearbox mounting structure (for example, see Japanese laid-open patent application publication No. 9-136651 (paragraphs 0015 to 0018, FIGS. 6 and 7). The steering gearbox mounting structure includes an arm downwardly extending from a steering gearbox fixed to a vehicle body and a rod forwardly extending from a lower end of the arm and fixed to the side frame.

However, this steering gearbox mounting structure has difficulty in providing a mounting space used for connecting a side frame at the side of the vehicle body to a steering gearbox with the arm and the rod. Further, a steering device used with this structure has difficulty in mounting operation thereof and complexity in structure thereof.

SUMMARY OF THE INVENTION

An aspect of the present invention provides a steering gearbox mounting structure for providing an impact absorbing stroke for an engine with a simple structure without any special mounting space.

Another aspect of the present invention provides a steering gearbox mounting structure for mounting on a subframe of a vehicle a steering gearbox for steering at least one wheel of the vehicle, the steering gearbox mounting structure comprising: an intermediate bracket for mounting the steering gearbox on the subframe, wherein the intermediate bracket comprises a breakable portion that breaks when a force greater than a predetermined force is applied to the breakable portion.

The steering gearbox is mounted on the intermediate bracket fixed to the subframe. Upon a head-on collision the engine arranged at the front part of the vehicle backwardly may move and push the steering gearbox arranged behind the engine. Application of the force greater than the predetermined force to the breakable portion may break the breakable portion in which a resultant stress concentrates at the intermediate bracket that mounts the steering gearbox on the subframe of the vehicle. This may cause the steering gearbox to become free and detached from the subframe and thus backwardly move in accordance with the force acting thereon.

Still another aspect of the present invention provides a steering gearbox mounting structure for mounting on a subframe of a vehicle a steering gearbox for steering at least one wheel of the vehicle, the steering gearbox mounting structure comprising: first and second intermediate brackets for mounting the steering gearbox extending in a width direction of the vehicle on the subframe at different places, wherein the first and second intermediate brackets comprise first and second kinds of breakable portions that break in different modes when a force greater than a predetermined force is applied to the first and second breakable portions, respectively.

The first kind of the breakable portion may tear and the second kind of the breakable portion may fracture when the force greater than the predetermined force is applied to the first and second breakable portions, respectively.

BRIEF DESCRIPTION OF THE DRAWINGS

Objects and features of the present invention will become more readily apparent from the following detailed description taken in conjunction with accompanying drawings in which.

The same or corresponding elements or parts are designated as like references throughout the drawings.

DETAILED DESCRIPTION OF THE INVENTION

First Embodiment

Figure 1:
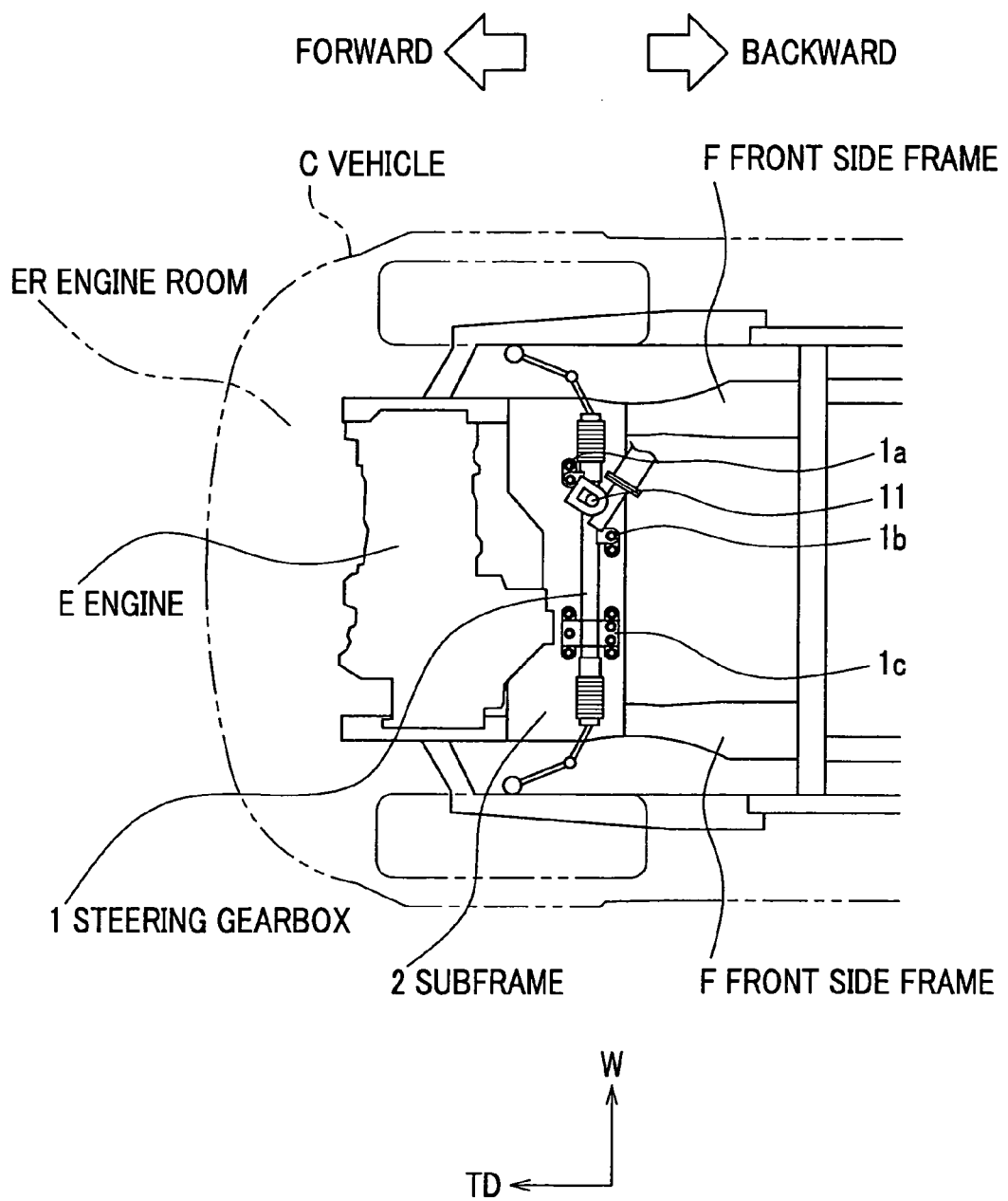
FIG. 1 is a plan view of an engine room where a steering gearbox according to the present invention is used.

An embodiment of a steering gearbox mounting structure according to the present invention will be described in detail with reference to drawings. FIG. 1 shows an engine room ER of a vehicle C having the steering gearbox mounting structure.

As shown in FIG. 1, an inside of the engine room ER at a front of the vehicle C is configured to mount a steering gearbox 1 as follows:

The vehicle C comprises front side frames F extending in a traveling direction TD of the vehicle C at both sides of the engine room ER viewed in the traveling direction TD. Further, a subframe 2 is bridged between and fixed to the front side frames F. An engine E is arranged in front of the subframe 2. The present invention provides the subframe mounting structure for mounting the steering gearbox 1 on the subframe 2.

The steering gearbox 1 is fixed to the subframe 2 through intermediate brackets 3A and 3B (see FIGS. 2-4B) having the same kind of breakable portions.

The steering gearbox 1 converts rotation of a steering wheel (not shown) into movement in a horizontal direction to transmit the movement to wheels of the vehicle C. The steering gearbox 1 has a contour of a substantially cylindrical form and is arranged in a width direction W of the vehicle C. At the right side of the steering gearbox 1 viewed in the traveling direction TD (upper side in FIG. 1) fixing portions 1a and 1b extend from the steering gearbox 1. The fixing portions 1a and 1b are arranged on the gearbox fixing portions 32a and 32b and fixed to the intermediate bracket 3A (see FIGS. 2 and 4A) with bolts B1. The fixing portions 1a and 1b extend in opposite directions of the traveling direction TD from the intermediate bracket 3A at different places in the width direction W. Extension of the fixing portions 1a and 1b at such different places in the width direction W increases rigidity in a structure including the subframe 2 and the intermediate bracket 3A. Further, at the left side (lower side in FIG. 1) of the steering gearbox 1 viewed in the traveling direction TD a band 1c is fixed to an upper surface of the intermediate bracket 3B to support the steering gearbox 1. Reference 11 denotes a pinion shaft for transmitting a rotational force to the steering gearbox 1.

Figure 2:
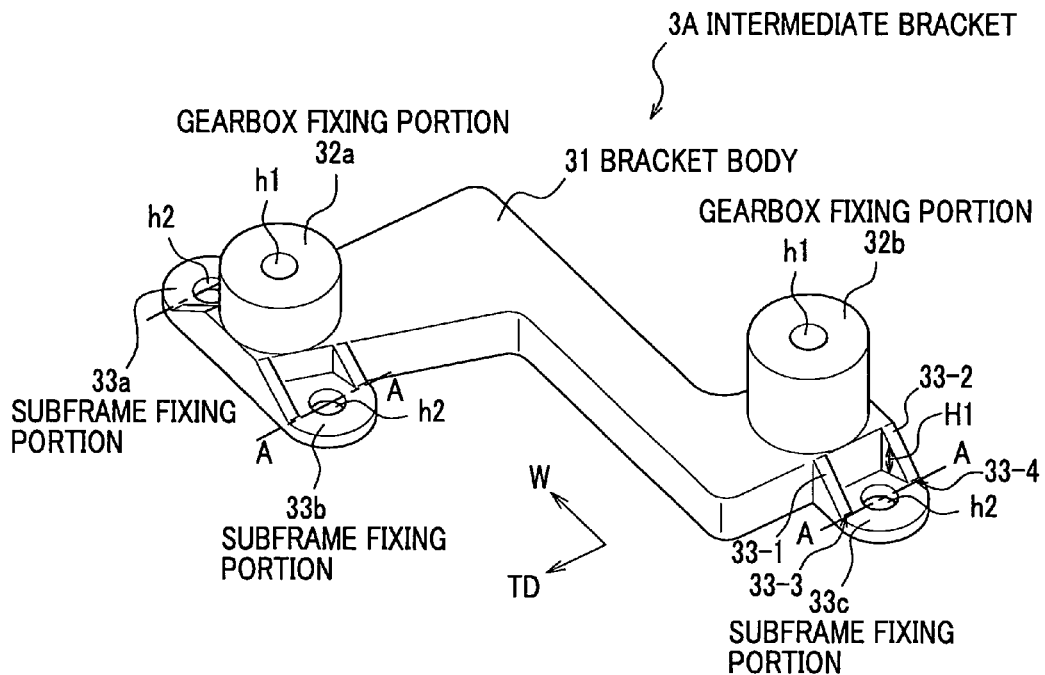
FIGS. 2 and 3 are perspective views of intermediate brackets according to a first embodiment of the present invention.

The intermediate bracket 3A shown in FIG. 2 is arranged at a right side of the engine room ER viewed in the traveling direction TD. The intermediate bracket 3A comprises a bracket body 31, a pair of gearbox fixing portions 32a vertically extending from an upper surface of the bracket body 31, and subframe fixing portions 33 (33a, 33b, and 33c), each horizontally extending from lower edges of the bracket body 31.

The subframe fixing portions 33a extends from the lower edge of the bracket body 31 in the width direction W, and the subframe fixing portions 33b and 33c extend from the lower edges of the bracket body 31 in the opposite width direction of the vehicle C.

The bracket body 31 is made in a substantially "L" shape in a plan view and has a sufficient thickness for a predetermined strength. On upper surfaces of ends of the L-shaped bracket body 31 are formed the gearbox fixing portions 32a and 32b.

The gearbox fixing portions 32a and 32b are arranged at locations corresponding to the fixing portions 1a and 1b (see FIG. 1) of the steering gearbox 1. The gearbox fixing portions 32a and 32b are cylindrical forms having thread holes h1 engageable with the bolts B1 (see FIG. 4A), respectively. The bolts B1 are inserted into the holes h1 in the gearbox fixing portions 32a and 32b through holes (not shown) in the fixing portions 1a and 1b by screwing the bolts B1 to fix a right side of the steering gearbox 1 viewed in the width direction W to the subframe 2.

The subframe fixing portions 33a, 33b, and 33c outwardly extend from the lower edges of the L-shaped bracket body 31, respectively. The subframe fixing portions 33 are formed to have through hole h2 for fixing the intermediate bracket 3A to the subframe 2. A thickness t of the subframe fixing portions 33 (see FIG. 4A) is smaller than a thickness t1 of the bracket body 31 to make the subframe fixing portions 33 breakable at portions as breaking lines (not shown) along chain lines A-A when a force applied to the steering gearbox 1 becomes greater than a predetermined force (a magnitude of the force becomes greater than a predetermined value). The intermediate bracket 3A is arranged so as to align its longitudinal direction with the width direction W of the vehicle C to make the subframe fixing portions 33a, 33b, and 33c extend in the width direction W, respectively and is fixed to the subframe 2 with bolts B2 (see FIG. 4A).

Figure 3:
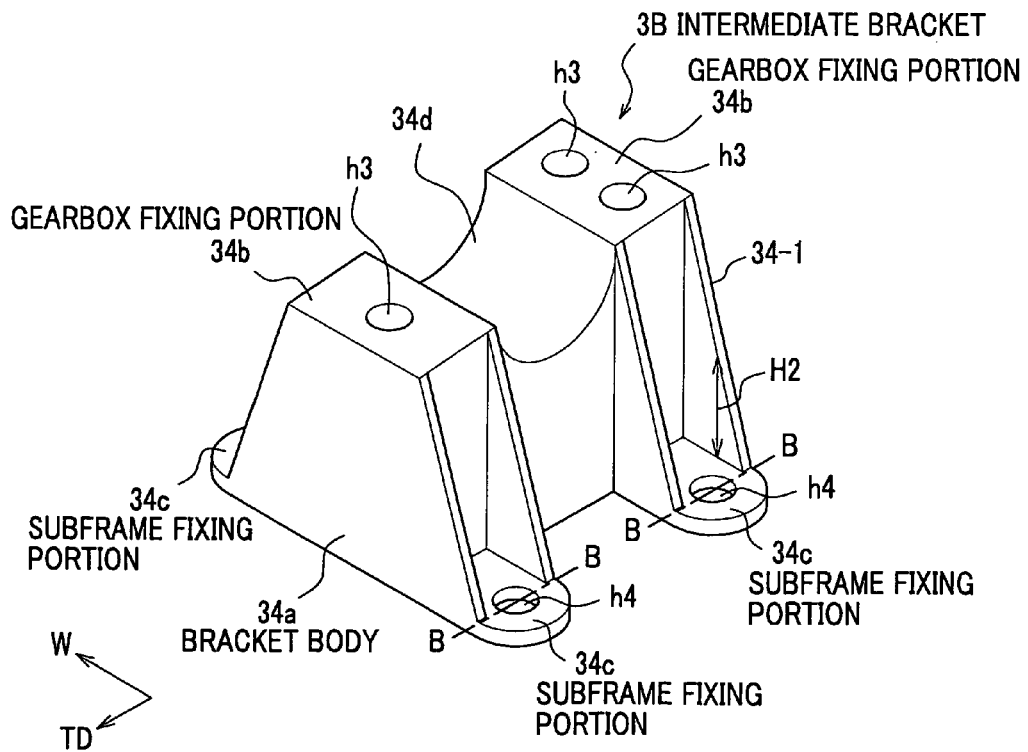

With reference to FIG. 3 will be described the intermediate bracket 3B to be arranged at the left side of the vehicle C viewed in the traveling direction TD.

The intermediate bracket 3B comprises a bracket body 34a formed in a substantially rectangular parallelepiped, a pair of gearbox fixing portions 34b and four subframe fixing portions 34c (FIG. 3 shows only three of them) outwardly extending from lower corners of the bracket body 34a.

The gearbox fixing portions 34b have threaded holes h3 engageable with the bolts (not shown in FIG. 3), respectively. The bolts are inserted into the holes h3 in the gearbox fixing portions 34b through holes (not shown) in the band 1c by screwing the bolts to fix the left portion of the steering gearbox 1 viewed in the traveling direction TD to the subframe 2. Provided between the gearbox fixing portions 34b is a supporting portion 34d having a curved groove for supporting the steering gearbox 1.

Each of the subframe fixing portions 34c is formed in a thin plate to break at portions as breaking lines (not shown) along chain lines B-B like the subframe fixing portions 33. Each of the subframe fixing portions 34c has a through hole h4 to be fixed to the subframe 2 with a bolt (not-shown). The intermediate bracket 3B is so arranged that the subframe fixing portions 34c extend in the width direction W, respectively, and is fixed to the subframe 2. Further, in this embodiment, four subframe fixing portions 34c are provided for fastening-at-four-point. However, the intermediate bracket 3B in structure is not limited to this. For example, the intermediate bracket 3B may be fixed to the subframe 2 at three points.

Figure 4A:
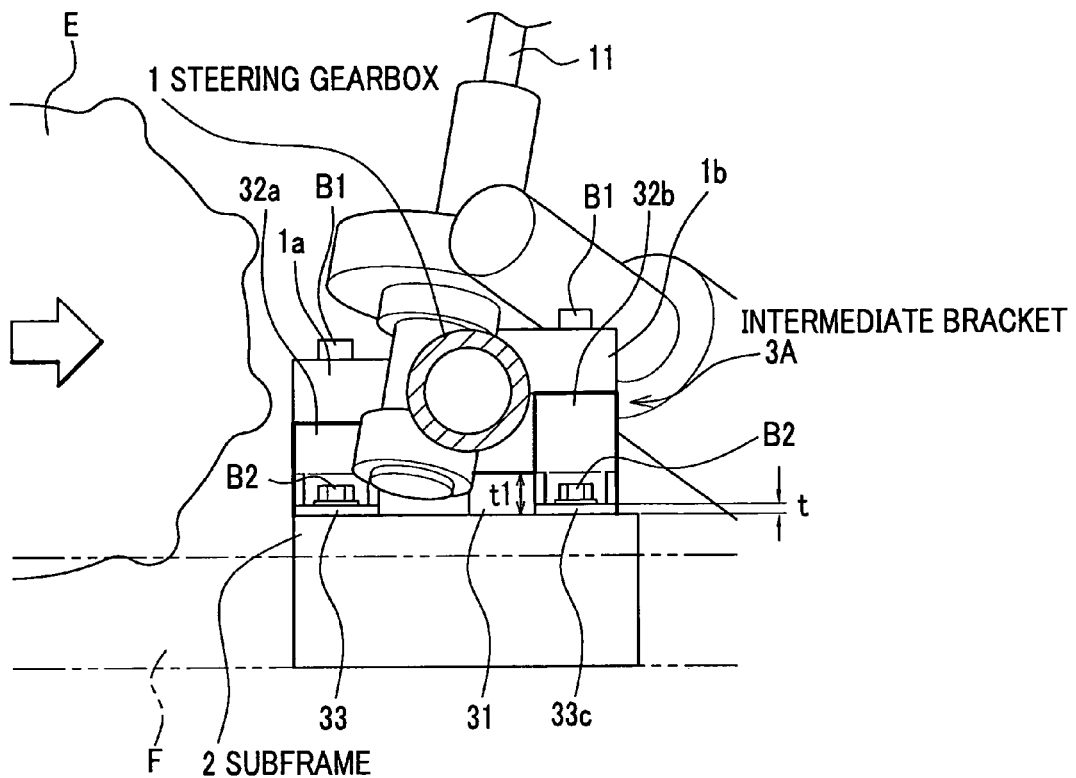
FIG. 4A is a side sectional view of an inside of the engine room with the intermediate brackets according to the first embodiment in a usual condition.
Figure 4B:
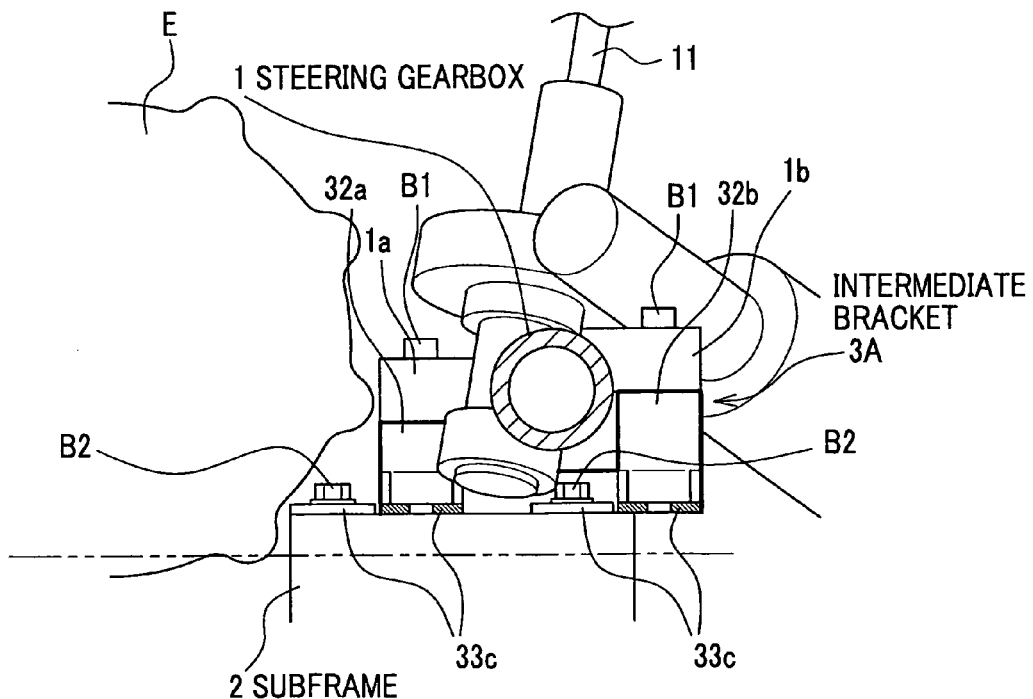
FIG. 4B is a side sectional view of the inside of the engine room with the intermediate brackets according to the first embodiment during a head-on collision.

With reference to FIGS. 4A and 4B will be described an operation of the steering gearbox mounting structure mentioned above.

FIG. 4A shows a usual positional relation where the engine E is fixed at the front of the engine room ER (at the left side in FIG. 4A) and the steering gearbox 1 is mounted behind the engine E.

Upon the head-on collision of the vehicle C, parts at a crushable zone (not shown) at the front of the vehicle C crush and the zone shrinks to allow the engine E to move backward. When the backward movement of the engine E applies the force greater than the predetermined force to the steering gearbox 1, a stress concentrates at the intermediate brackets 3A and 3B, so that the subframe fixing portions 33 having a lowest strength in the intermediate bracket 3A break at the breaking lines along the chain line A-A, and the subframe fixing portions 34c of the intermediate bracket 3B break at the breaking lines along the chain lines B-B. This makes the steering gearbox 1 and the intermediate brackets 3A and 3B free from the subframe 2 and move backward by the backward movement of the engine E.

The breakage of the subframe fixing portions 33 of the intermediate bracket 3A and the subframe fixing portions 34c of the intermediate bracket 3B allows the steering gearbox 1 to be removed from the subframe 2, so that the steering gearbox 1 can be moved backward by the backward movement of the engine E, providing an impact absorbing stroke of the engine E.

Further, the subframe fixing portions 33 of the intermediate bracket 3A break at the breaking lines along the chain lines A-A shown in FIG. 2, and the subframe fixing portions 34c of the intermediate bracket 3B break at the breaking lines along the chain lines B-B shown in FIG. 3. Accordingly most of all of the intermediate brackets 3A and 3B do not remain at the side of the subframe 2, so that the impact absorbing stroke of the engine E is made the longer.

Further, since only making the subframe fixing portions 33 and the subframe fixing portions 34c thin provides the structure allowing the steering gearbox 1 to be removed from the subframe 2, sufficient rigidities of the intermediate brackets 3A and 3B can be secured.

The steering gearbox mounting structure is established only with the intermediate brackets 3A and 3B intervening between the steering gearbox 1 and the subframe 2 to provide the sufficient impact absorbing stroke with a simple structure. Further, the structure requires no special mounting space, and mounting operation is easier than conventional operation.

Second Embodiment

Figure 5:
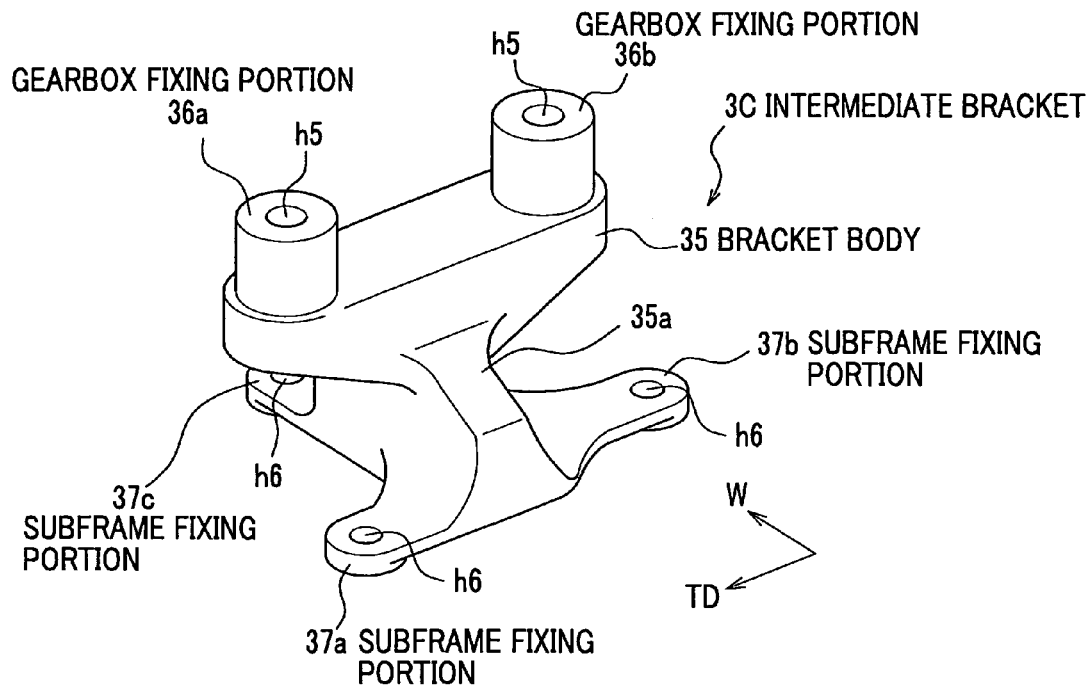
FIG. 5 is a perspective view of intermediate brackets according to a second embodiment of the present invention.
Figure 6:
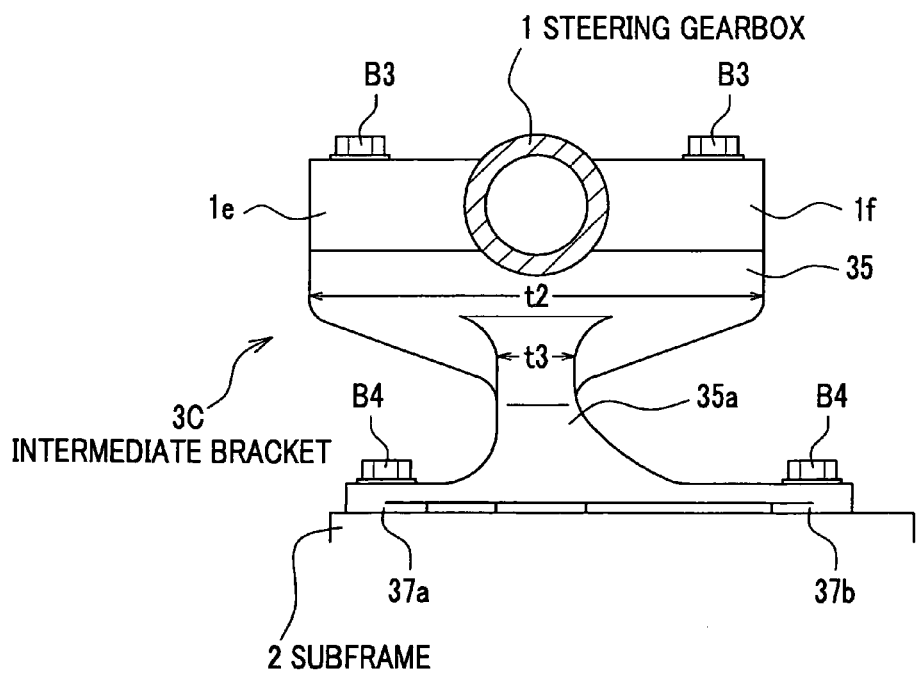
FIG. 6 is a side sectional view of the intermediate brackets according to the second embodiment.

FIG. 5 shows an intermediate bracket 3C of a second embodiment in a perspective view, and FIG. 6 illustrates, in a sectional view, the intermediate bracket 3C that is used to fix the steering gearbox 1 to the subframe 2. The structure of the second embodiment is provided by partially modifying that of the first embodiment, and thus, a duplicated description will be omitted with the same elements designated as the same references.

Figure 7A:
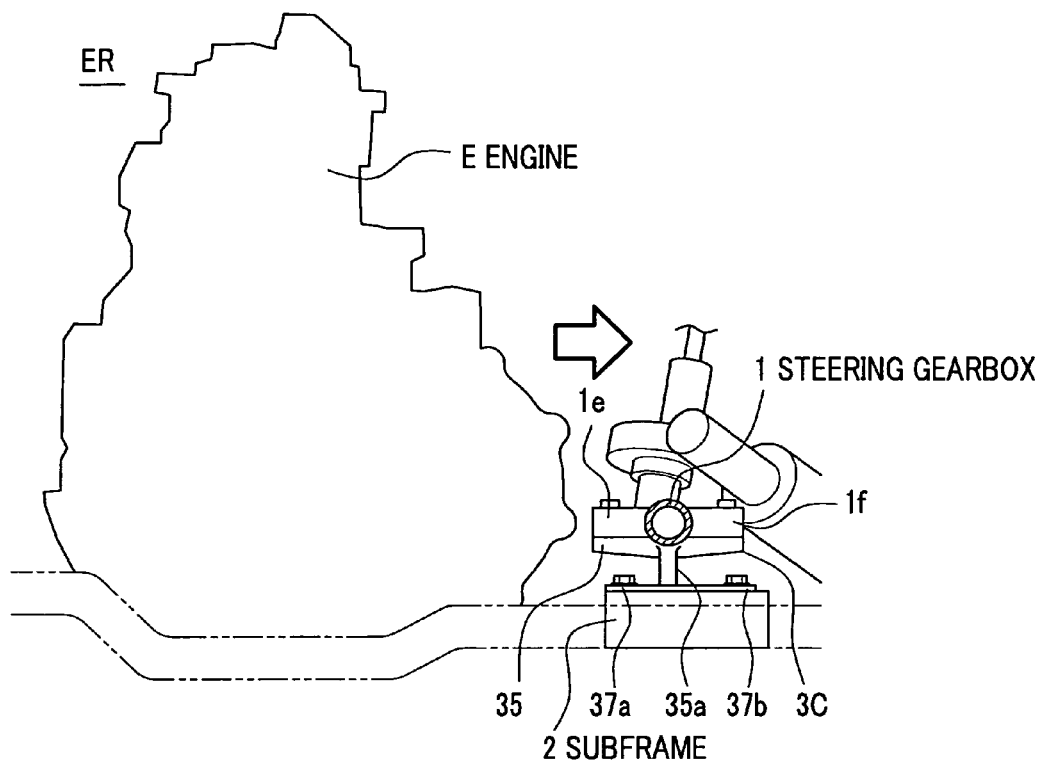
FIG. 7A is a side sectional view of the inside of the engine room with the intermediate bracket according to the second embodiment in a usual condition.

In the second embodiment, the steering gearbox 1 is fixed to the subframe 2 with the intermediate brackets 3C (see FIG. 7A). Here, a pair of the intermediate brackets 3C arranged at both sides of the engine room ER viewed in the traveling direction TD have the same structure (the same kind of breakable structure), and thus, will be described only the intermediate bracket 3C at the right side of the engine room ER viewed in the traveling direction TD.

As shown in FIG. 5, the intermediate bracket 3C comprises a bracket body 35, a pair of gearbox fixing portions 36a and 36b vertically extending from an upper surface of the bracket body 35, and subframe fixing portions 37 (37a, 37b, 37c) extending from a lower portion of the bracket body 35 in three different horizontal directions.

The bracket body 35 intervenes between the gearbox fixing portions 36a and 36b and the subframe fixing portions 37 and has a predetermined height. Further, the bracket body 35 is designed to have such a form as to stabilize balance between the gearbox fixing portions 36a and 36b provided on the upper surface of the bracket body 35 and the subframe fixing portions 37a, 37b, and 37c fixed to the lower portion thereof. Provided at a central portion in a vertical direction of the bracket 35 is a recess portion 35a having a thin portion in a side view in order to be broken by a force greater than a predetermined force.

As shown in FIG. 5, the gearbox fixing portions 36a and 36b are cylindrical forms having threaded holes h5 engageable with bolt B3 (see FIG. 6), respectively, and support the fixing portions 1e and 1f of the steering gearbox shown in FIG. 6, respectively. The fixing portions 1e and 1f in an assembled condition extend in the vehicle traveling direction TD and opposite direction from same positions of the steering gearbox viewed in the width direction W1, respectively. The gearbox fixing portions 36a and 36b are located at locations corresponding to the fixing portions 1e and 1f. The bracket body 35 also supports a cylindrical form of the steering gearbox at the upper surface thereof between the gearbox fixing portions 36a and 36b.

The subframe fixing portions 37 (37a, 37b, and 37c) extend from the lower portion of the bracket body 35 in the three different directions so as to have a substantially "T" form in a plan view in which the subframe fixing portion 37c extends from the middle of a line between the subframe fixing portions 37a and 37b. These subframe fixing portions 37 have through holes h6 for fixing the intermediate bracket 3C to the subframe 2 with bolts B4. The intermediate bracket 3C is arranged so as to align an extending direction of the subframe fixing portions 37a and 37b with the vehicle traveling direction TD and fixed to the subframe 2 with the subframe fixing portions 37a, 37b, and 37c (see FIG. 6).

Figure 7B:
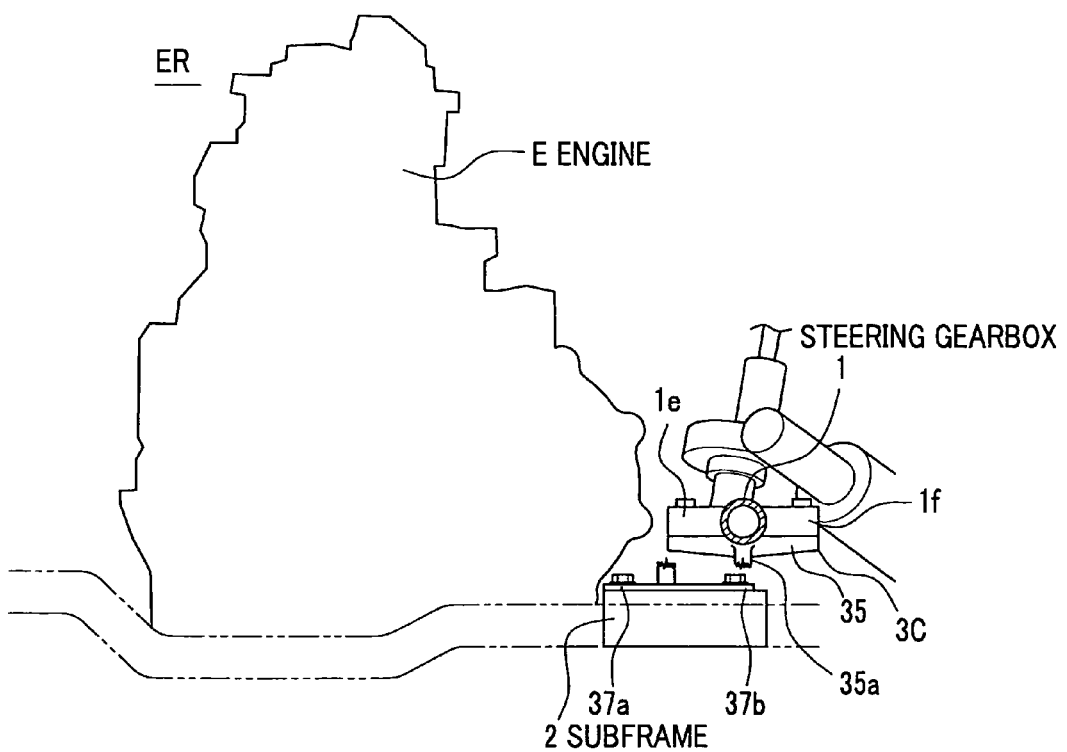
FIG. 7B is a side sectional view of the inside of the engine room with the intermediate bracket according to the second embodiment during a head-on collision.

With reference to FIGS. 7A and 7B will be described an operation of the steering gearbox mounting structure mentioned above.

FIG. 7A shows a usual positional relation of the engine E and the steering gearbox mounting structure, and FIG. 7B illustrates the engine room ER after a collision.

Usually, the engine E is fixed at the front of the engine room ER (at the left side in FIG. 7A) and at back thereof is mounted the steering gearbox 1.

Upon the head-on collision of the vehicle C, parts at the crushable zone (not shown) at the front of the vehicle C crush and the zone shrinks to allow the engine E to move backward. When the backward movement of the engine E applies a force greater than a predetermined force to the steering gearbox 1, a stress concentrates at the intermediate brackets 3C, so that the recess portion 35a of the intermediate bracket 3C having a lowest strength breaks. This releases the steering gearbox 1 and the intermediate brackets 3C from the subframe 2, and thus the backward movement of the engine E backwardly pushes the steering gearbox 1 and the intermediate brackets 3C.

The breakage of the recess portion 35a of the intermediate brackets 3C allows the steering gearbox 1 to be removed from the subframe 2, so that the steering gearbox 1 can be moved backward by the backward movement of the engine E, providing an impact absorbing stroke of the engine E.

Further, the intermediate brackets 3C have a predetermined height. This structure provides a degree of freedom in determining the position of breakage.

Further, the steering gearbox mounting structure is established only with the intermediate brackets 3C intervening between the steering gearbox 1 and the subframe 2 to provide a sufficient impact absorbing stroke with a simple structure. Further, the structure requires no special mounting space, and mounting operation is easier than conventional operation.

In the first embodiment, the subframe mounting portions 33 comprise a plate having the hole h2 allowing the bolt B2 to penetrate therethrough.

Further, the plate is fixed to the subframe 2 with the hole h2 and the bolt B2 and is broken (tear) by the bolt B2 when a force is applied to the intermediate bracket 3A because the movement of the intermediate bracket 3A on the head-on collision is applied through the plate to the bolts B2 which break (tear) the plate of the subframe fixing portion 33. The subframe fixing portions 34c similarly operate.

Each of the subframe fixing portions 33 further comprises a rib 33-1 having a first edge connected to the bracket body 31 and a second edge connected to an upper surface of the plate having the hole h2. The rib 33-1 outwardly extends from the bracket body 31 along the plate to a location corresponding to the hole h2 to determine the breaking line along the chain line A-A of the plate and to reinforce the subframe fixing portion 33 in a vertical direction and the width direction W.

The rib 33-1 comprises a taper (triangular) plate arranged perpendicularly to the plate and has a height H1 decreases toward the location 33-3 corresponding to the hole h2 in the width direction W to determine the breaking line along the chain line A-A of the plate.

The rib 33-1 extends from the bracket body 31 in the width direction W of the vehicle C when the steering gearbox mounting structure is assembled in the vehicle C.

The intermediate bracket 3A further comprises another rib 33-2 having the same structure as the rib 33-1. More specifically, the rib 33-2 comprises a taper (triangular) plate arranged perpendicular to the plate and includes a height decreasing toward the location 33-4 corresponding to the hole h2 in the width direction W to determine the breaking line along the chain line A-A of the plate together with the rib 33-1 and the hole h2.

The intermediate bracket 3B has a similar structure, that is, has a rib 34-1 of which height H2 decreases toward the hole h4 like the intermediate bracket 3A.

The subframe fixing portions 33 have a first strength in the width direction W of the vehicle C and a second strength in the traveling direction TD which is lower than the first strength.

The intermediate bracket 3A (3B, and 3C) has a third strength in the width direction W of the vehicle and has a fourth strength in the traveling direction TD is lower than the third strength.

In the second embodiment, the recess portion 35a has a thickness t3 smaller than a thickness t2 of the intermediate bracket 3C other than the recess portion 35a in the traveling direction TD of the vehicle C.

Modification

The embodiments of the present invention have been described. However, the present invention is not limited to these embodiments, but may be modified.

For example, in the first and second embodiments, the intermediate brackets 3A and 3B (3C) having the same kind of breakable portions are used for the steering gearbox mounting structure. However, these may be modified. More specifically, the intermediate bracket 3A of which subframe fixing portions 33 are breakable and the intermediate bracket 3C of which recess portion 35a is breakable are used at the same time for supporting the right and left sides of the steering gearbox 1, respectively. Further, the intermediate bracket 3C of which recess portion 35a is breakable and the intermediate bracket 3B of which subframe fixing portions 34c are breakable may be used at the same time for supporting the right and left sides of the steering gearbox 1, respectively.

Figure 8:
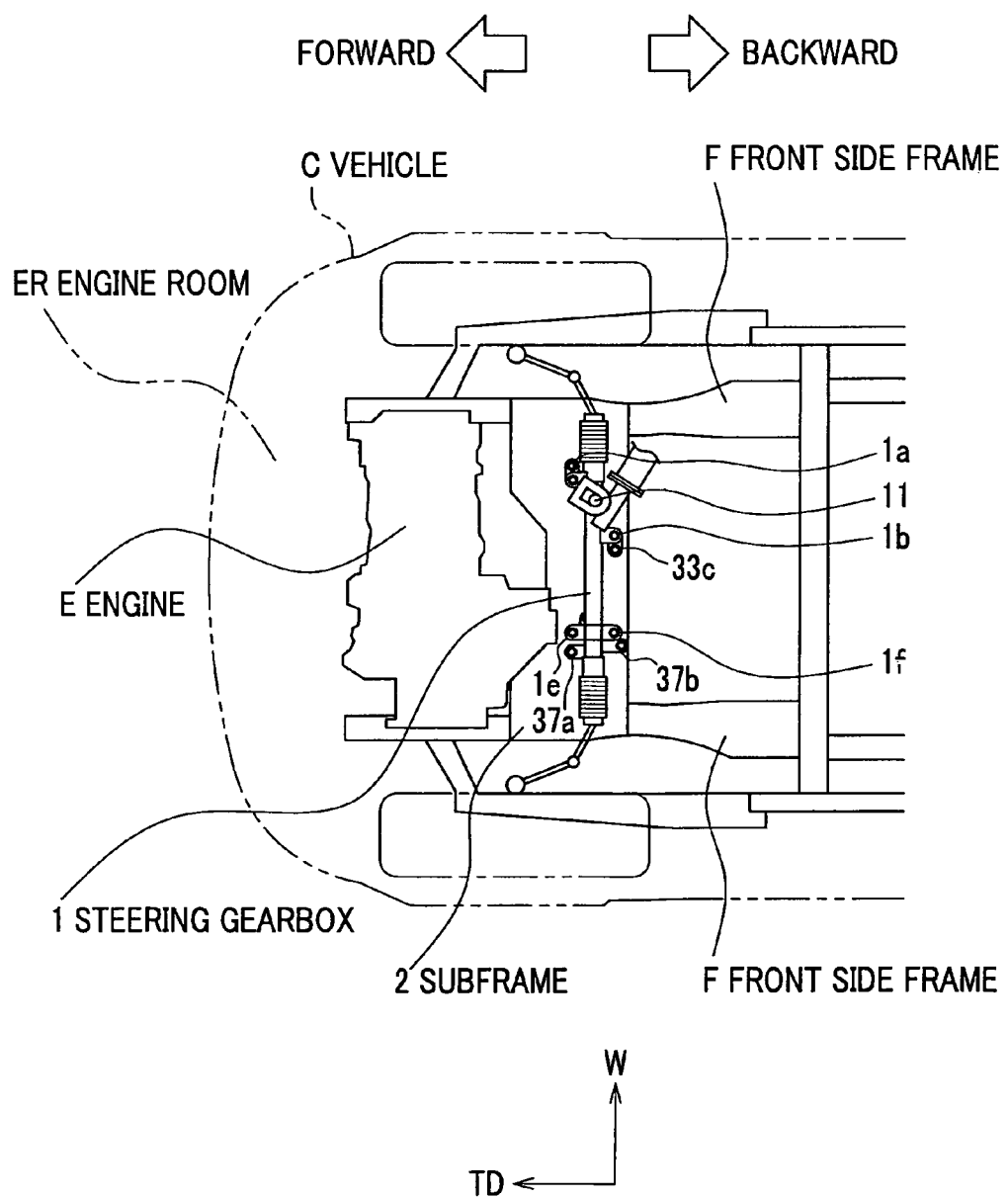
FIG. 8 is a plan view of an engine room showing a modification of a steering gearbox mounting structure according to the present invention.

FIG. 8 illustrates this more specifically in which the intermediate bracket 3A having the breakable portion 33c and the intermediate bracket 3C having the breakable portion 37a and 37b are provided to mount on the subframe 2 the steering gearbox 1 extending in the width direction W of the vehicle C at different places of the subframe 2 in the width direction W. The first and second intermediate brackets 3A and 3C comprise first and second kinds of breakable portions 33 and 35c that are breakable in different modes when a force greater than a predetermined force is applied to the first and second breakable portions 33 and 35c, respectively.

When being subject to the force greater than the predetermined force, the first kind of breakable portion 33 tears. When being subject to the force, the second kind of breakable portion 35c fractures.

Furthermore, in the present invention, the breakable portions 33, 34c, and 35a should be provided between the steering gearbox 1 and the subframe 2. Thus, the gearbox fixing portions 32a and 32b and the subframe fixing portions 37 may be breakable.

Further, in the first embodiment, all subframe fixing portions 33a, 33b, and 33c are made thin. However, a part of them may be made thin because when one of the subframe fixing portions is broken upon a collision, then the force concentrated on a remaining part of the subframe fixing portions 33 which will break the remaining part. In other words, the thickness may be provided stepwise for the subframe fixing portions 33a, 33b, and 33c (34a, 34b, 34c, and 34d).

In the first embodiment, the thickness t of the subframe fixing portions 33 (see FIG. 4A) in the vertical direction is smaller than a thickness t1 of the bracket body 31 to make the subframe fixing portions 33 breakable at the breaking line along the chain line A-A when the force that is greater than the predetermined force. However, the thickness t of the subframe fixing portions 33 in the vertical direction may be equal to the thickness t1 of the bracket body 31, but a thickness of the subframe fixing portions 33 in the horizontal direction may be made smaller to make the subframe fixing portions 33 breakable when the force greater than the predetermined force occurs. In other words, the breakable portion comprises at least one lower strength portion than other part of the intermediate bracket 3A, 3B, or 3C between the steering gearbox 1 and the subframe 2 in the traveling direction TD.

The invention claimed is:

1. A steering gearbox mounting structure for mounting, on a subframe of a vehicle, a steering gearbox for steering at least one wheel of the vehicle, the steering gearbox mounting structure comprising:
    an intermediate bracket for mounting the steering gearbox on the subframe, wherein the intermediate bracket is removably installable on a vehicle frame between the steering gearbox and the subframe, wherein the intermediate bracket comprises:
        a breakable portion that is structured and configured to break when a force greater than a predetermined force is applied to the breakable portion; and
        a subframe fixing portion integrally formed on the intermediate bracket, the breakable portion formed at the subframe fixing portion, wherein the subframe fixing portion attaches the intermediate bracket to the subframe;
    and wherein the subframe fixing portion has a thickness less than a thickness of a bracket body of the intermediate bracket; and is configured to break in the event of a collision of the vehicle;
    wherein the intermediate bracket further comprises a gearbox fixing portion for fixing the steering gearbox to the intermediate bracket, and the bracket body extending between the gearbox fixing portion and the subframe fixing portion, and wherein the subframe fixing portion comprises a thin portion extending outwardly from the bracket body; and
    wherein the bracket body is substantially L-shaped.

2. The steering gearbox mounting structure as claimed in claim 1, wherein the thin portion comprises a plate that extends from the bracket body and is fixed to the subframe, and has such a thickness as to break when the force is applied to the breakable portion.

3. The steering gearbox mounting structure as claimed in claim 2, wherein the plate has a hole for penetrating a bolt therethrough and is fixed to the subframe with the bolt, and the plate is broken by the bolt when the force is applied to the breakable portion by movement between the bracket body and the subframe.

4. The steering gearbox mounting structure as claimed in claim 1, wherein the breakable portion has a first strength in a width direction of the vehicle and a second strength in a traveling direction of the vehicle which is lower than the first strength.

5. The steering gearbox mounting structure as claimed in claim 1, wherein the intermediate bracket has a first strength in a width direction of the vehicle and has a second strength in the traveling direction of the vehicle which is lower than the first strength.

6. A steering gearbox mounting structure for mounting, on a subframe of a vehicle, a steering gearbox for steering at least one wheel of the vehicle, the steering gearbox mounting structure comprising:
   an intermediate bracket for mounting the steering gearbox on the subframe, wherein the intermediate bracket is removably installable on a vehicle frame between the steering gearbox and the subframe, wherein the intermediate bracket comprises:
   a breakable portion that is structured and configured to break when a force greater than a predetermined force is applied to the breakable portion, said breakable portion comprising a subframe fixing portion for fixing the intermediate bracket to the subframe; and
   a gearbox fixing portion for fixing the steering gearbox to the intermediate bracket, and a bracket body extending between the gearbox fixing portion and the subframe fixing portion, and wherein the subframe fixing portion comprises a thin portion extending outwardly from the bracket body, the thin portion comprising a plate that extends from the bracket body and is fixed to the subframe, and has such a thickness as to break when the force is applied to the breakable portion;
   and wherein the plate extends from the bracket body in a width direction of the vehicle when the steering gearbox mounting structure is assembled in the vehicle.

7. A steering gearbox mounting structure for mounting, on a subframe of a vehicle, a steering gearbox for steering at least one wheel of the vehicle, the steering gearbox mounting structure comprising:
   an intermediate bracket for mounting the steering gearbox on the subframe, wherein the intermediate bracket comprises a breakable portion that is structured and configured to break when a force greater than a predetermined force is applied thereto;
   wherein the intermediate bracket comprises a subframe fixing portion as the breakable portion for fixing the intermediate bracket to the subframe and further comprises a gearbox fixing portion for fixing the steering gearbox to the intermediate bracket, and a bracket body extending between the gearbox fixing portion and the subframe fixing portion, and wherein the subframe fixing portion comprises a thin portion extending outwardly from the bracket body;
   wherein the thin portion comprises a plate that extends from the bracket body and is fixed to the subframe, and has such a thickness as to break when the force is applied thereto;
   wherein the plate has a hole for penetrating a bolt therethrough and is fixed to the subframe with the bolt, and the plate is broken by the bolt when the force is applied to the breakable portion by movement between the bracket body and the subframe;
   and wherein the intermediate bracket further comprises a rib having a first edge connected to the bracket body and a second edge connected to a surface of the plate, the rib extending perpendicularly to the plate and extending outwardly from the bracket body up to a location corresponding to the hole in the width direction to determine a breaking line on the plate.

8. The steering gearbox mounting structure as claimed in claim 7, wherein the rib comprises a taper plate including a height that decreases toward the location to determine the break line of the plate.

9. The steering gearbox mounting structure as claimed in claim 8, wherein the rib extends from the bracket body in a width direction of the vehicle when the steering gearbox mounting structure is assembled in the vehicle.

10. The steering gearbox mounting structure as claimed in claim 7, wherein the intermediate bracket further comprises another rib having a first edge connected to the bracket body and a second edge connected to the surface of the plate having the hole, the another rib extending perpendicularly to the plate and extending outwardly from the bracket body up to a location corresponding to the hole in the width direction to determine the breaking line on the plate together with the rib and the hole.

11. The steering gearbox mounting structure as claimed in claim 10, wherein the another rib comprises a taper plate including a height which decreases toward the location to determine the break line of the plate, wherein a line between tips of the rib and the another rib is aligned with a traveling direction of the vehicle when the steering gearbox mounting structure is assembled in the vehicle.

12. The steering gearbox mounting structure of claim 7, wherein the bracket body is substantially L-shaped.

13. A steering gearbox mounting structure for mounting, on a subframe of a vehicle, a steering gearbox for steering at least one wheel of the vehicle, the steering gearbox mounting structure comprising:
   an intermediate bracket for mounting the steering gearbox on the subframe, wherein the intermediate bracket is removably installable on a vehicle frame between the steering gearbox and the subframe, and wherein the intermediate bracket comprises:
   a breakable portion that is structured and configured to break when a force greater than a predetermined force is applied to the breakable portion;
   a subframe fixing portion for fixing the intermediate bracket to the subframe,
   a gearbox fixing portion for fixing the steering gearbox to the intermediate bracket, and
   a substantially L-shaped bracket body extending between the gearbox fixing portion and the subframe fixing portion.

* * * * *